United States Patent

Ohi et al.

[11] Patent Number: 5,857,017
[45] Date of Patent: Jan. 5, 1999

[54] CALL WAITING NOTIFYING APPARATUS

[75] Inventors: Hirokazu Ohi, Kawasaki; Shigeru Nishikawa, Yokohama; Michihiro Izumi, Kawasaki, all of Japan

[73] Assignee: Canon Kabushiki Kaisha, Tokyo, Japan

[21] Appl. No.: 959,284

[22] Filed: Oct. 24, 1997

Related U.S. Application Data

[63] Continuation of Ser. No. 598,187, Feb. 2, 1996, abandoned, which is a continuation of Ser. No. 774,251, Oct. 10, 1991, abandoned.

[30] Foreign Application Priority Data

Oct. 12, 1990 [JP] Japan ..................... 2-274318
Dec. 25, 1990 [JP] Japan ..................... 2-413615

[51] Int. Cl.⁶ .............. H04M 1/00; H04M 3/42; H04J 3/12
[52] U.S. Cl. ............ 379/157; 379/261; 379/215; 370/270; 370/271
[58] Field of Search .................... 379/127, 142, 379/156, 157, 164, 165, 201, 207, 209, 215; 370/259, 260, 261, 271, 270

[56] References Cited

U.S. PATENT DOCUMENTS

| 4,581,733 | 4/1986 | Sarson et al. | 370/67 |
| 4,873,719 | 10/1989 | Reese | 379/215 |
| 4,899,358 | 2/1990 | Blakley | 379/142 X |
| 4,937,856 | 6/1990 | Natarajan | 370/62 X |
| 4,975,944 | 12/1990 | Cho | 379/215 X |
| 5,128,989 | 7/1992 | Nomura | 370/62 X |
| 5,195,131 | 3/1993 | Sano | 379/215 X |

FOREIGN PATENT DOCUMENTS

| 56-56063 | 5/1981 | Japan . |
| 62224155 | 3/1986 | Japan . |
| 63294054 | 5/1987 | Japan . |
| 3078364 | 8/1989 | Japan . |
| 0145855 | 6/1991 | Japan | 379/215 |

*Primary Examiner*—Paul Loomis
*Attorney, Agent, or Firm*—Fitzpatrick, Cella, Harper & Scinto

[57] ABSTRACT

A call waiting notifying apparatus including a discriminating circuit to discriminate to see if a call reception has been generated from a digital line to an analog terminal in communication or not; and a transmitting circuit to transmit a predetermined tone to the analog terminal if the generation of the call waiting is determined by the discriminating circuit. The discriminating circuit discriminates the generation of the call waiting on the basis of a command received through a control channel of the digital line.

49 Claims, 11 Drawing Sheets

F I G . 9

| CALLING PARTY NUMBER | CALL WAITING SOUND SOURCE |
|---|---|
| 2 2 2 - 2 2 2 2 | 1 |
| 0 3 - X X X - X X X X | 1 |
| ⋮ | ⋮ |
| NONE | 2 |

CALL WAITING NOTIFYING APPARATUS

This application is a continuation of application Ser. No. 08/598,187 filed Feb. 2, 1996, now abandoned, which is a continuation of application Ser. No. 07/774,251 filed Oct. 10, 1991, abandoned.

BACKGROUND OF THE INVENTION

1. Field of the Invention

The invention relates to a call waiting notifying apparatus for notifying the generation of a call for a terminal in communication to terminal in communication.

2. Description of the Related Background Art

Hitherto, in a communication through an analog public network, if a new reception request has been generated in calling, such a fact is notified from the analog public network as a calling sound mixed into a call voice. Therefore, in a private branch exchange in which a plurality of analog public lines are enclosed and a plurality of analog extension terminals are connected, if a call to one of the extension terminals has been received in communication through the analog public line, a call waiting is notified to such an extension terminal by a calling sound mixed in the call voice. That is, the private branch exchange itself doesn't execute any process regarding the operations during the communication and reception.

On the other hand, in the communication through a digital public network, in the case where a new reception request has been generated in calling, a call waiting notification is received from the public network through a control channel and the occurrence of the reception can be known. However, in the private branch exchange in which a plurality of digital public lines are enclosed and a plurality of extension terminals are connected, if a call waiting has occurred in the digital line in which the extension terminal is in communication, the private branch exchange can recognize the occurrence of the call waiting, but the analog extension terminal cannot recognize the occurrence of the call waiting.

FIG. 1 is a block system diagram showing a construction of a conventional private branch exchange. In the diagram, reference numeral 1 denotes a main apparatus of a private branch exchange; 2 a communication line; 3 a line I/F (interface) unit; 4 a central control unit (CPU); 5 a highway switch; 6 a subscriber's circuit; 7 a digital/analog converting circuit (D/A converter); 8 an analog/digital converting circuit (A/D converter); 9 a data bus and an address bus; 10a and 10b channels (highways); 11 a subscriber's line; and 12a to 12c single telephones (SLT) (hereinafter, shown by common reference numeral 12).

The operation of the apparatus of FIG. 1 will now be described.

If a call reception from the line (analog line) 2 has been made, the line I/F unit 3 detects the call reception and notifies the reception to the CPU 4. The CPU 4 allows a preset one of the extension single telephones 12a to 12c to ring through the subscriber's circuit 6. When the SLT 12 is off-hooked, the subscriber's circuit 6 detects the off-hook and notifies to the CPU 4. The CPU 4 switches the highway switch 5 so as to connect a time slot allocated to the analog line to which the call reception has occurred and a time slot allocated to the off-hooked single telephone, thereby starting a communication. That is, the line 2 is connected to the SLT 12 through the line I/F unit 3, highway 10a, highway switch 5, highway 10b, subscriber's circuit 6, and subscriber's line 11.

If a call waiting request has been generated from the analog line in communication, the reception request notification directly arrives at the SLT 12 in a state in which it is mixed into a voice signal. When the user of the SLT 12 recognizes the reception request notification signal and executes a hooking operation, the subscriber's circuit 6 detects the hooking and notifies to the CPU 4. The CPU 4 notifies the transmission of the signal indicative of the hooking to the line I/F unit 3. The line I/F unit 3 sends a hooking signal to the line 2 and notifies the acceptance of the reception to the analog network.

In the digital line, generally, the data such as a voice or the like which is needed by the subscriber and the data which is necessary for exchange and connection are separated. If a reception request has been generated in calling, the reception request notification is sent to the line I/F unit 3 through a channel (hereinafter, referred to as a control channel) to transmit the data which is necessary for exchange and connection. Although the line I/F unit 3 can notify a fact of the call waiting to the CPU 4 through the data bus 9, the I/F unit 3 cannot notify a fact of the call waiting to the SLT 12 connected to the extension.

As mentioned above, in the above conventional apparatus, if a call waiting has been generated through the digital line, the private branch exchange can recognize the generation of the call waiting but the extension terminal cannot recognize the generation of the call waiting, so that the call waiting service cannot be effectively utilized.

On the other hand, it is impossible to determine from which partner a new reception has been performed, so that a significance about such a reception cannot be presumed. That is, the calling person cannot compare which one of the present call in calling and the new reception has a priority, so that he cannot help temporarily interrupting the present call in calling in order to know the content of the communication of the new reception. Moreover, there is a case where if the called party had answered the calling party of the new call, its significance is so low that there is no need to interrupt the present call in calling or a case where in spite of the fact that a communication with the calling party of the new call should have been given the priority, the new reception is abandoned in calling and the call is disconnected because the call interruption is too late.

The calling party can be discriminated by the calling party number information which is sent from an ISDN (Integrated Digital Service Network). However, if a telephone of the called party is an analog telephone, the calling party number information cannot be directly sent by a communication control procedure of the ISDN, so that the calling party cannot be identified by using the calling party number information upon call waiting.

SUMMARY OF THE INVENTION

It is an object of the invention to improve a call waiting notifying apparatus.

Another object of the invention is to improve a private branch exchange which can connect a digital network.

Another object of the invention is to inform a call waiting notification from a digital network to an analog terminal.

Further another object of the invention is to enable an analog terminal to respond to a call waiting notification from a digital network.

Further another object of the invention is to inform a call waiting notification to an analog terminal by a good sound quality.

Further another object of the invention is to provide a call waiting notifying apparatus which sends a notification sound corresponding to a partner who has performed a call waiting to a terminal.

The above and other objects and features of the present invention will become apparent from the following detailed description and the appended claims with reference to the accompanying drawings.

BRIEF DESCRIPTION OF THE DRAWINGS

FIG. 9 is a format diagram showing a corresponding table in the third embodiment of the invention;

DETAILED DESCRIPTION OF THE PREFERRED EMBODIMENTS

Figure 2:
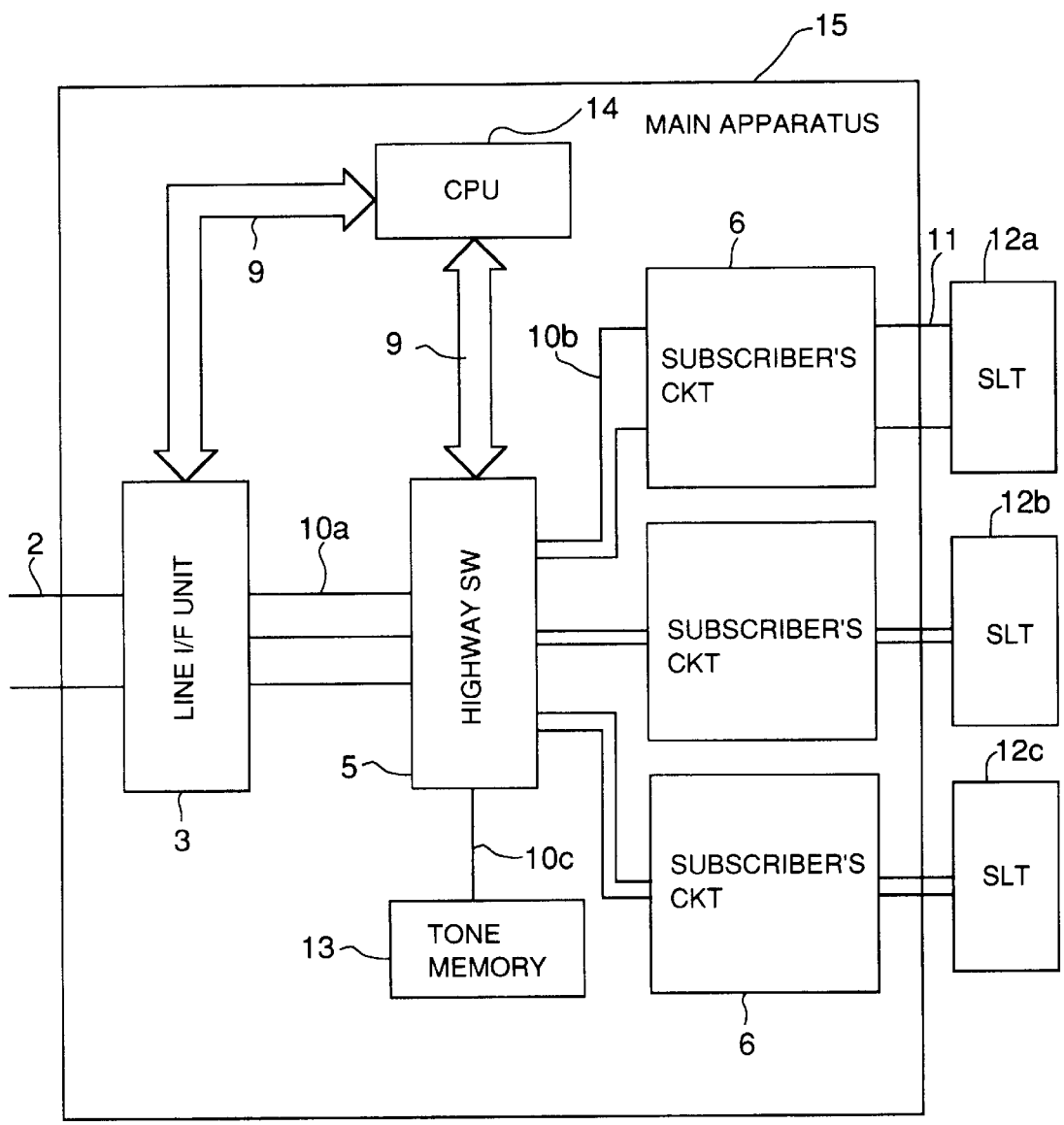
FIG. 2 is a block diagram showing a private branch exchange according to the first embodiment of the invention.

FIG. 2 is a block diagram showing a construction of a private branch exchange of the first embodiment of the invention. In the diagram, reference numeral 15 denotes a main apparatus of the private branch exchange; 2 the digital communication line; 3 the line I/F unit; 14 a central control unit (CPU); 5 the highway switch; 6 the subscriber's circuit; 9 the data bus and address bus; 10a to 10c the channels (highways); 11 the subscriber's line; 12a to 12c the single telephones (SLT) as analog extension terminals; and 13 a tone memory.

Figure 1:
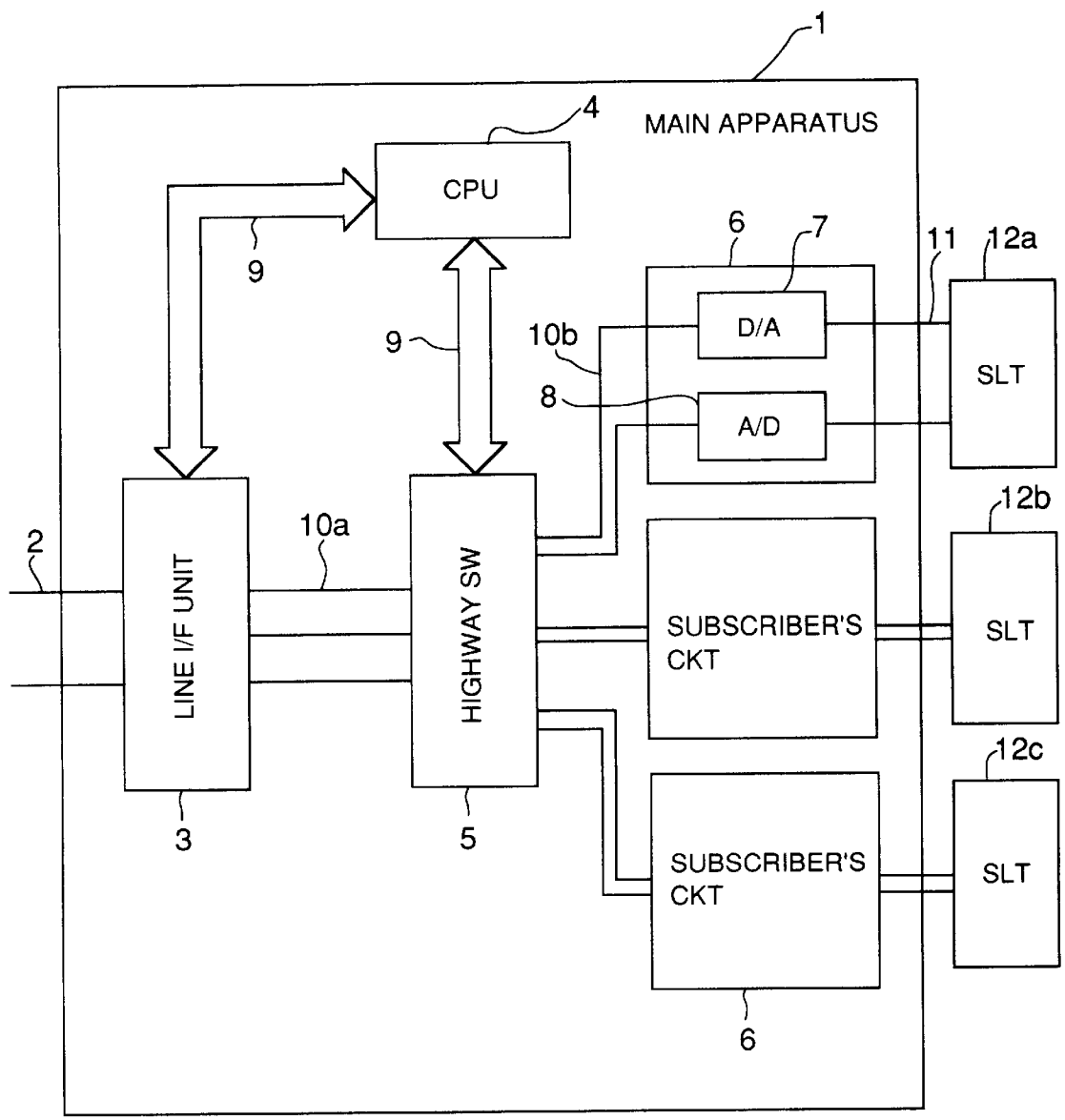
FIG. 1 is a block diagram showing a conventional private branch exchange.

The operations of the above component elements in the ordinary calling mode are similar to those in the conventional apparatus of FIG. 1. The tone memory 13 has a function to store a call waiting notification sound.

Figure 3:
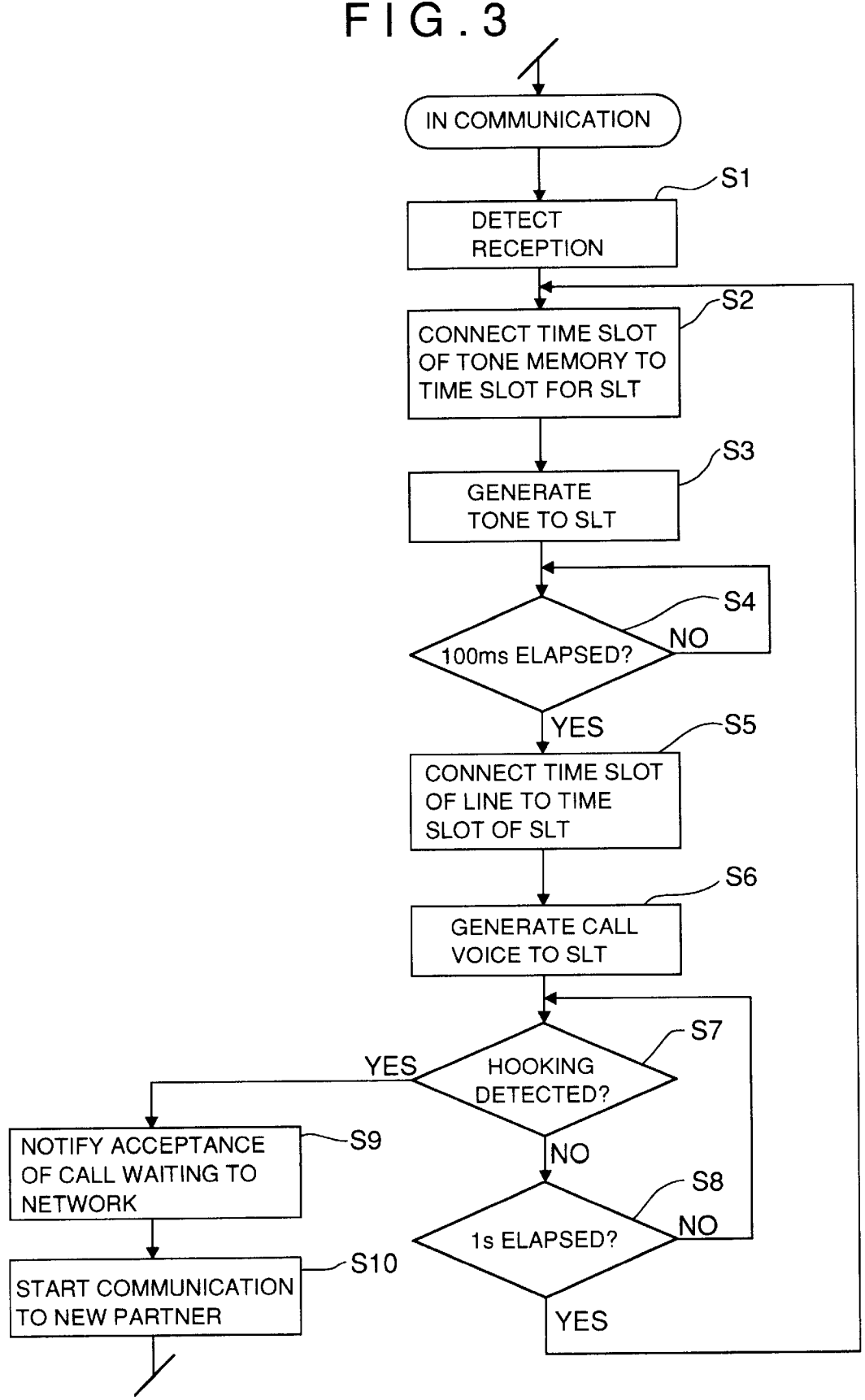
FIG. 3 is a processing flowchart upon call waiting in the first embodiment.

FIG. 3 is a flowchart for a processing procedure upon generation of a call waiting in the embodiment.

The operation upon call waiting in the private branch exchange of the embodiment will now be described with reference to FIGS. 2 and 3. In calling, the digital line 2 is connected to the SLT 12a through the line I/F unit 3, highway 10a, highway switch 5, highway 10b, subscriber's circuit 6, and subscriber's line 11 in a manner similar to the conventional apparatus. When a reception request has been generated in calling, a reception request notification command is sent to the line I/F unit 3 by a control channel of the line 2. The line I/F unit 3 informs a fact of the call waiting to the CPU 14 via the data bus 9. The CPU 14 switches the highway switch 5. That is, according to the embodiment, a state in which the highways 10a and 10b are connected is changed to a state in which the highways 10b and 10c are connected. During the above changing operation, the data in the tone memory 13 is allowed to reach the SLT 12a.

A practical control is as shown in a flowchart of FIG. 3. That is, if the CPU 14 detects a reception in communication (step S1), the CPU 14 connects the time slot of the tone memory 13 to the time slot to the SLT 12, thereby connecting the highways 10b and 10c (step S2). A tone from the tone memory 13 is allowed to be heard by the user of the SLT 12 (step S3). If 100 msec has elapsed (step S4), the highways 10a and 10b are connected (step S5), thereby allowing a call voice to be heard by the user of the SLT 12 (step S6). After one second has elapsed, the processing routine is returned to step S2 (step S8).

As mentioned above, the user of the SLT 12 can hear the tone of 100 msec every second.

When the user recognizes the tone from the tone memory 13 and executes the hooking operation, the subscriber's circuit 6 detects the hooking and sends a hooking detection signal to the CPU 14 (step S7). The CPU 14 stops the switching operation of the highway switch 5 in steps S2 to S8 and connects the highways 10a and 10b. At the same time, the CPU 14 sends a signal indicative of the acceptance of the call waiting to the line I/F unit 3 (step S9). The line I/F unit 3 sends the call waiting acceptance signal to the line 2 through the control channel, thereby starting the communication with the new partner (step S10).

In the embodiment, a similar effect can be obtained even in the case where one voice channel is provided for one digital line or the case where a plurality of voice channels are provided for one digital line. However, in the case where a plurality of voice channels exist for one digital line, the CPU 14 executes a control regarding to which channel the call waiting request should be executed when all of the voice channels are busy.

In the embodiment, on the other hand, the invention has been realized by intermittently accessing the call waiting notification tone from the tone memory 13. However, the user of the SLT 12 can freely set a time interval of the call waiting notification tone and a length of such a tone.

Although FIG. 2 shows the system comprising one line wire and three extensions, a similar effect can be also obviously obtained irrespective of the numbers of line wires and extensions. Although only the analog single telephones have been connected to the extensions in the embodiment, the invention can be also applied to other systems in which exclusive telephones peculiar to the system mixedly exist.

The invention can be also similarly applied to the case where a call waiting from the digital line has been generated in communication through the analog public network or in extension communication.

The second embodiment will now be described.

Figure 4:
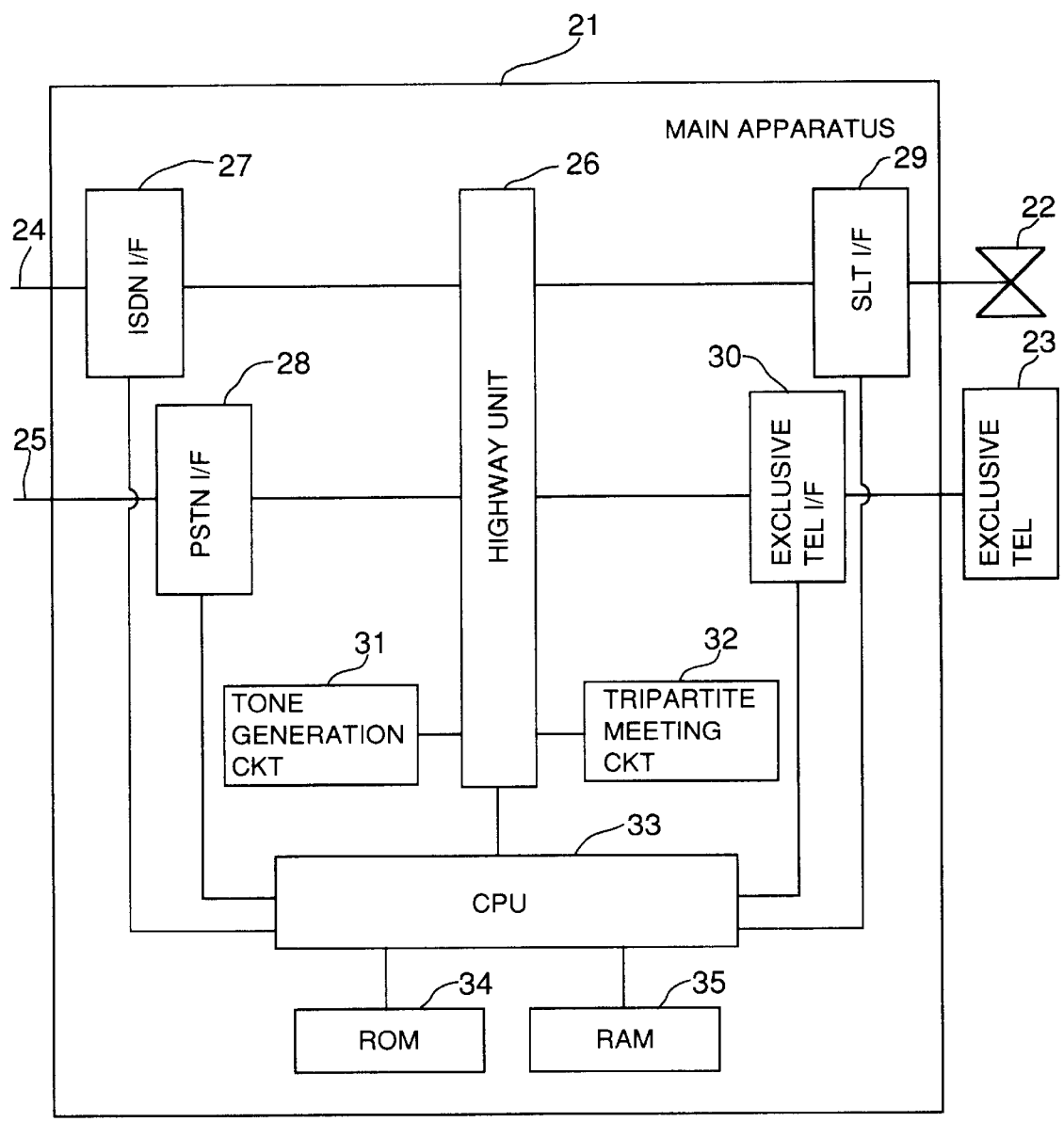
FIG. 4 is a block diagram showing the second embodiment.

FIG. 4 shows a construction of a private branch exchange according to the second embodiment. In the diagram, reference numeral 21 denotes a main apparatus of a key telephone apparatus; 22 an analog single telephone; 23 an exclusive (private) telephone; 24 an ISDN line as a digital communication network which provides call waiting call (speech communication) services; 25 a PSTN line as an analog public network; 26 a highway unit to exchange calls; 27 an ISDN interface; 28 a PSTN interface; 29 a single telephone interface (SLT I/F); 30 an exclusive telephone I/F; 31 a tone generation circuit to generate various kinds of tones including a call waiting notification tone; 32 a tripartite meeting circuit; 33 a CPU to control the whole main apparatus 21; 34 an ROM in which a control program of the CPU 33 has been stored; and 35 an RAM which provides a work area for various data and various calculations for control of the CPU 33.

In the above construction, the operation when a synthesized output of the call waiting notification tone and a call signal of the ISDN line is supplied to the SLT 22 by using the tripartite meeting circuit 32 will now be described with reference to flowcharts of FIGS. 4 and 5.

Figure 5:
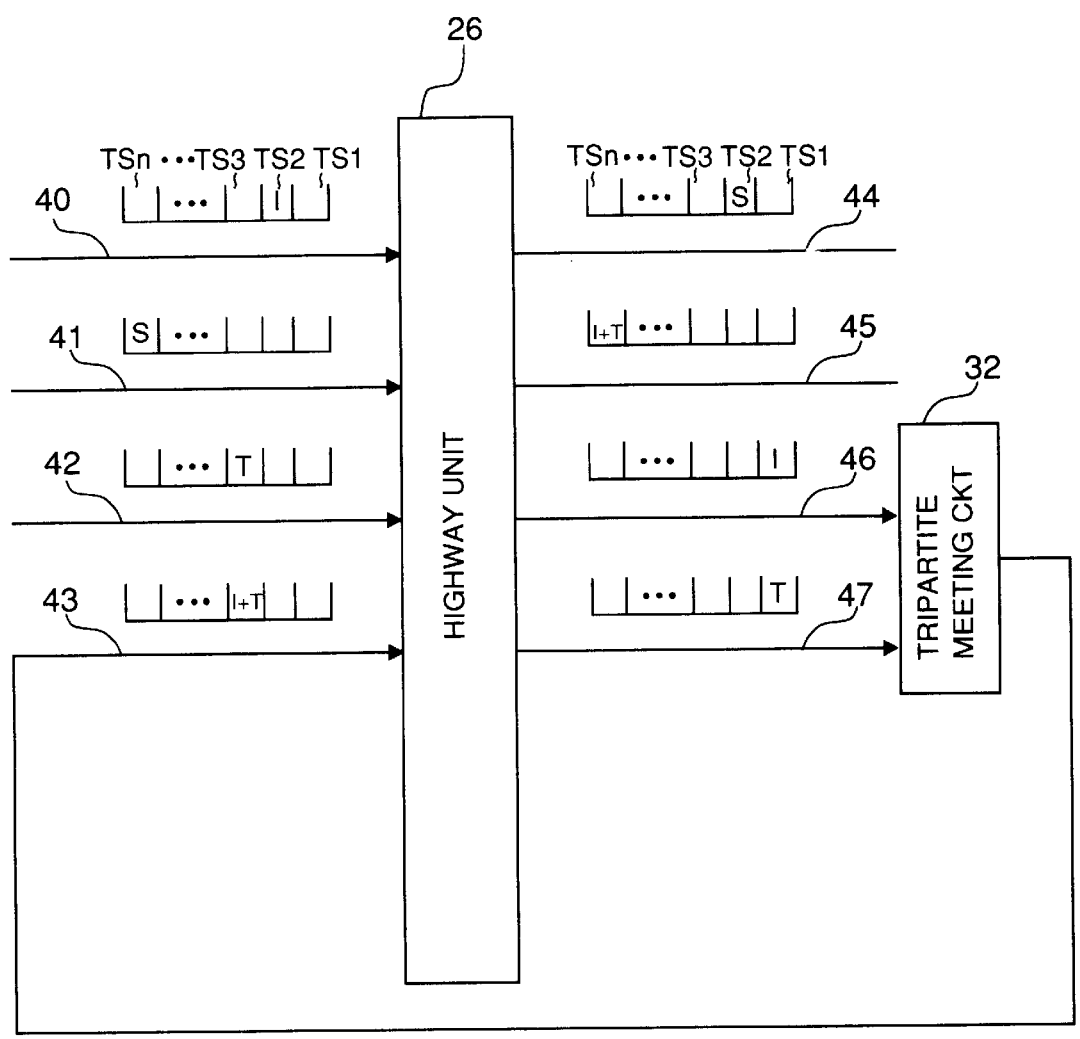
FIG. 5 is an explanatory diagram of connecting states in highways in the second embodiment.

FIG. 5 is an explanatory diagram for explaining connecting states of the highways between the ISDN line 24 and the SLTs 22 in the embodiment. Reference numerals 40 to 43 denote input highways and 44 to 47 indicate output highways. In the digital key telephone apparatus, as shown in FIG. 5, call signals are transmitted in predetermined time bands on the highways which are inputted and outputted to/from the highway unit 26. Each of the predetermined time bands is called a time slot. The call signal which is multiplexed to the time slot of each of the input highways is mutually transmitted to the time slot of the partner on the output highway by the highway unit 26, thereby realizing the two-way communication.

Figure 6:
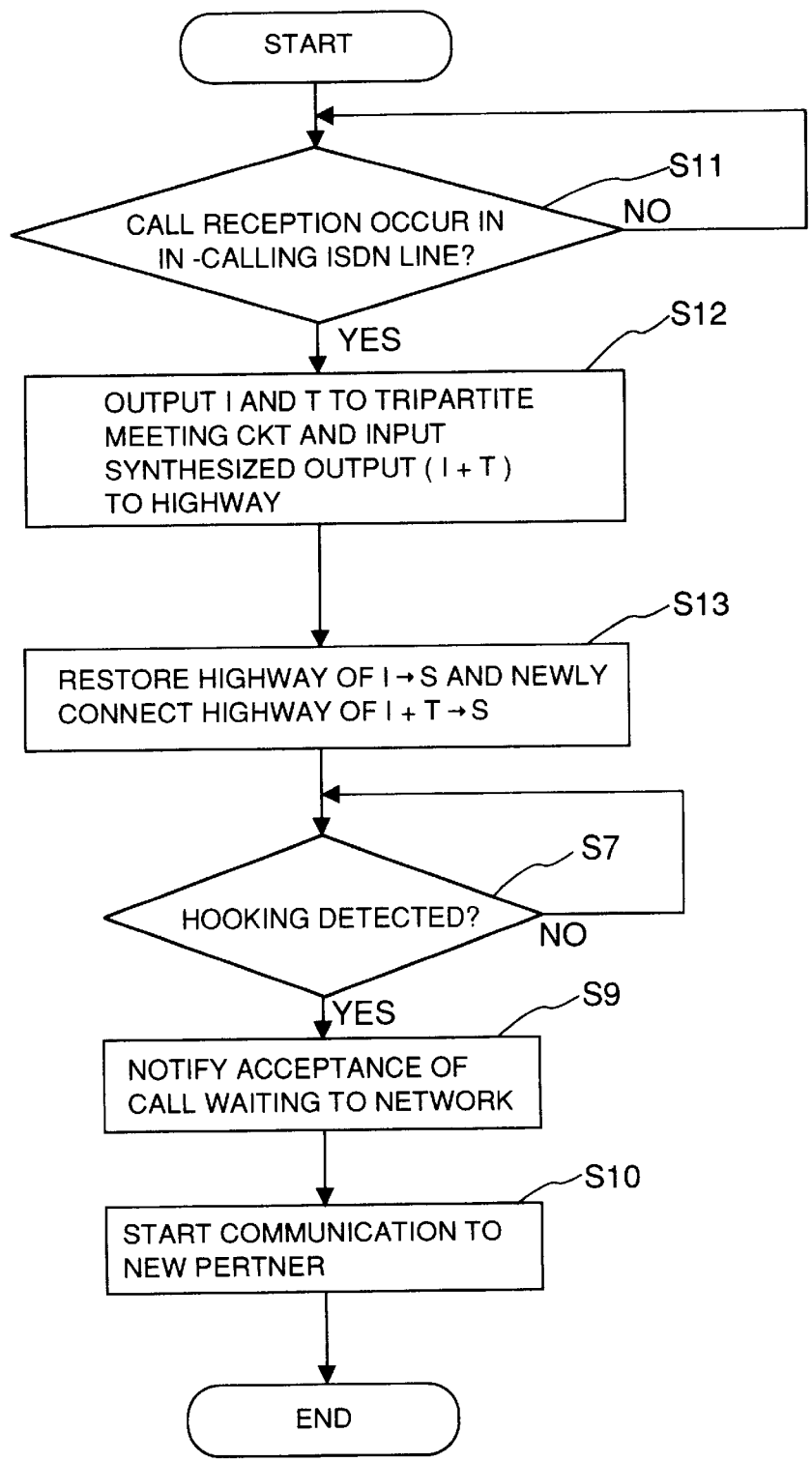
FIG. 6 is a flowchart for explaining the operation of the second embodiment.

In FIG. 5, the ISDN line 24 is allocated to a time slot $TS_2$ of the input and output highways 40 and 44 and the single telephone 22 is allocated to a time slot $TS_n$ of the input and output highways 41 and 45. The operation in the case where a call reception has been generated from another partner to the ISDN line 24 during the communication between the ISDN line 24 and the SLT 22 will be described hereinbelow with reference to FIG. 5 in accordance with a flowchart of FIG. 6.

When a call reception is generated from another partner to the ISDN line 24 in calling (step S11), the ISDN interface 27 detects the generation of the call reception and informs to the CPU 33. The CPU 33 controls the highway unit 26 and generates the call signal "I" (time slot $TS_2$ of the input highway 40) of the ISDN line 24 and a call waiting notification "T" (time slot $TS_3$ of the input highway 42) from the tone generation circuit 31 to the same time slot ($TS_1$ in FIG. 5) of the output highways 46 and 47 which are inputted to the tripartite meeting circuit 32. The above call signal "I" and tone "T" are synthesized by the tripartite meeting circuit 32 and the synthesized output "I+T" is generated in association with a time delay of two time slots and is supplied to a time slot $TS_3$ of the input highway 43 (step S12). The CPU 33 restores the path of the channel to which the time slot $TS_2$ of the input highway 40 for the ISDN line 24 and the time slot $TS_n$ of the output highway 45 for the SLT 22 have been connected, thereby forming the channel of the time slot $TS_3$ of the input highway 43 and the time slot $TS_n$ of the output highway 45 which have been allocated to "I+T" synthesized by the tripartite meeting circuit 32 (step S13).

The subsequent processes are similar to those in steps S7, S9, and S10 in FIG. 3.

As mentioned above, in the case where there is a reception to the ISDN line 24 in calling between the ISDN line 24 and the SLT 22, by transmitting the synthesized output of the call waiting notification tone and the call signal of the ISDN line 24 to the SLT 22 without interrupting the call, the call waiting can be informed to the SLT 22. On the other hand, even in the case where a call waiting had been generated from the digital line or analog line in communication through the analog public network or in extension communication, the invention can be similarly embodied.

The third embodiment of the invention will now be described hereinbelow with reference to the drawings.

Figure 7:
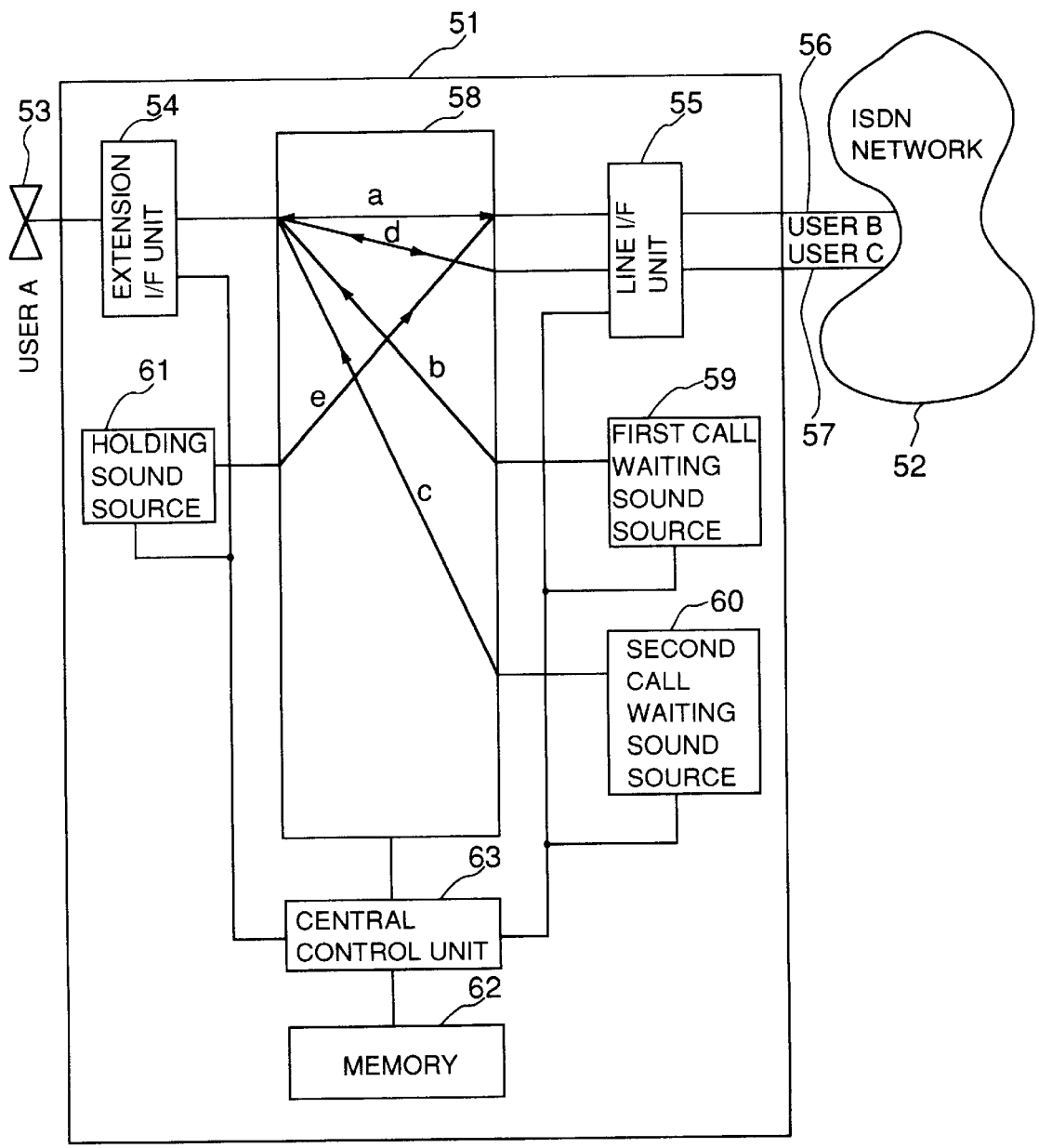
FIG. 7 is a block diagram showing the third embodiment of the invention.

FIG. 7 is a block diagram showing a private branch exchange of the third embodiment of the invention. One end of a private branch exchange 51 is connected to an ISDN network 52 and the other end is connected to an analog telephone 53.

Reference numeral 54 denotes an extension interface unit for enclosing the extension of the analog telephone 53 and for executing a predetermined extension control. Reference numeral 55 denotes a line interface unit for enclosing ISDN lines such as first ISDN line 56 and a second ISDN line 57 and the like from the ISDN network 52 and for executing a predetermined line control. Reference numeral 58 denotes a time division switch to execute a change-over of channels and the like.

Reference numeral 59 denotes a first call waiting sound source; 60 a second call waiting sound source which can send a plurality of different call waiting information from the first and second call waiting sound sources 59 and 60 to a destination of a call reception; 61 a holding sound source which is used to temporarily interrupt the call with the partner who is at present in calling or the like; 62 a memory comprising an ROM and an RAM to store various kinds of control information; and 63 a central control unit (CPU) to control the above component elements (time division switch 58 and the like).

In the above private branch exchange 51, when a user A executes an originating call to a user B from analog telephone 53 through the first ISDN line 56, the analog telephone 53 and the first ISDN line 56 are connected as shown by an arrow a, so that the users A and B are set into a calling state. In this state, if a call reception is generated from the user C to the analog telephone 53 through the second ISDN line 57, the CPU 63 compares and collates the calling party number which has previously been stored in the memory 62 and the call waiting information which has been received from the ISDN line 57 because the users A and B are busy. Then, the CPU 63 sends a call waiting sound to the user A from either one of the first and second call waiting sound sources 59 and 60 in correspondence to the calling party number as shown by an arrow b or c. That is, the user A can hear the call waiting sound corresponding to the call waiting partner during the connection of the channel with the user B. If the user A thinks that the user C is a preferential partner than the user B, the user A disconnects the call of the first ISDN line 56 and sets the channel with the second ISDN line 57 as shown by an arrow d and can talk to the user C. On the other hand, if the user A thinks that the user B should be given a priority than the user C, the user A ignores the call waiting sound and can continue the call with the user B.

In the embodiment, in the case where the user A cannot judge the priority of the user C on the basis of the call waiting sounds from the first and second call waiting sound sources 59 and 60, the call waiting is activated. That is, the call with the user B is held and a holding sound is supplied from the holding sound source 61 to the user B as shown by an arrow e. The channel is switched from the arrow a to the arrow d, thereby starting the call with the user C.

Figure 8:
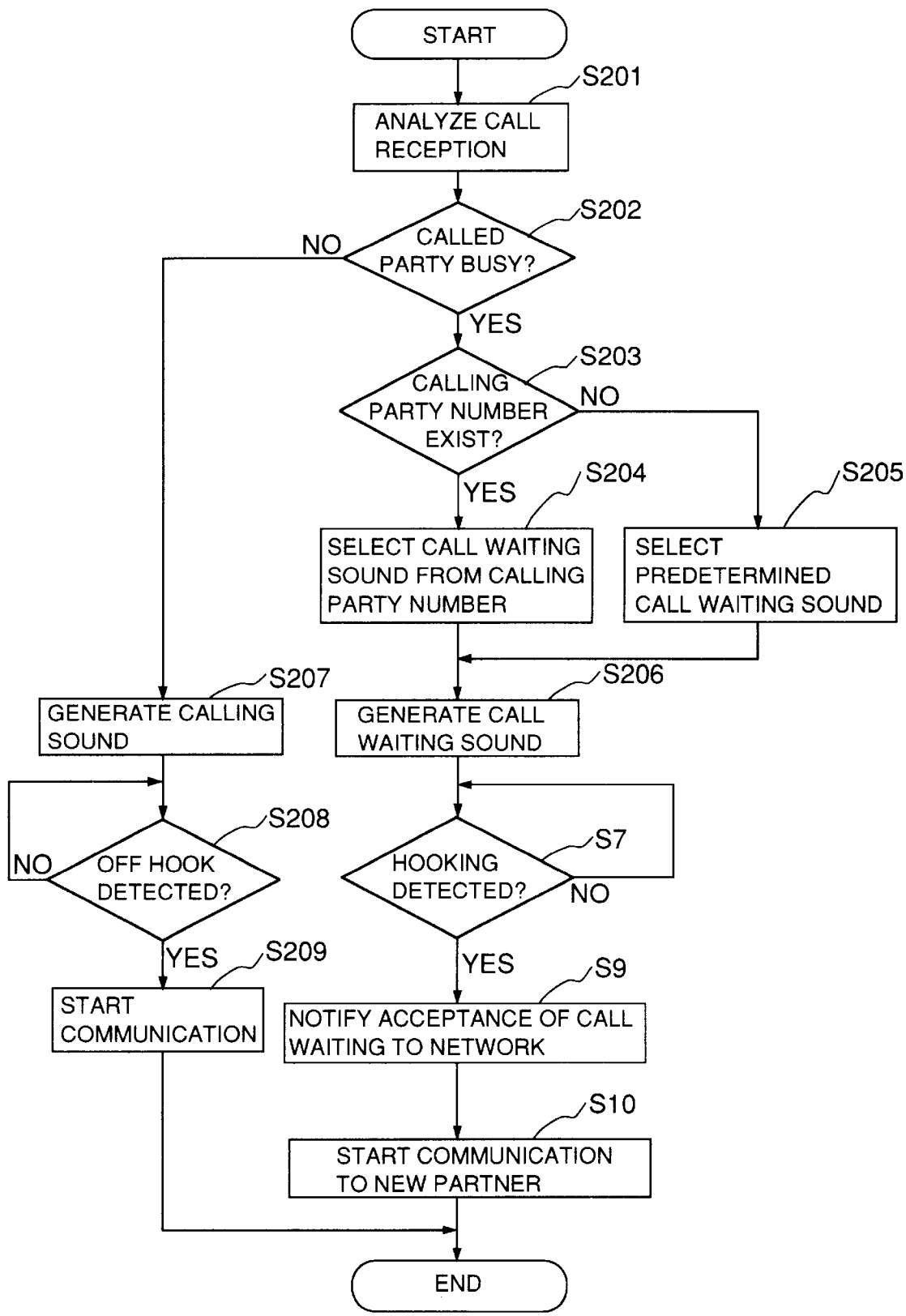
FIG. 8 is a flowchart showing a control procedure according to the third embodiment of the invention.

FIG. 8 is a flowchart showing a control procedure in the case where a call reception has been generated from the user C to the user A in calling with the user B.

First, when a call reception has been generated from the user C to the user A by a dial-in, predetermined call control messages of the ISDN are transmitted and received between the CPU 63 and the user C. In the dial-in, since a receiving party number to designate the called party is included in the call control message, the CPU 63 analyzes the receiving party number (step S201). A check is now made to see if the called party (user A) is busy or not (step S202). If the CPU 63 determines that the called party is busy, a check is made to see if a calling party number exists in the received call control message or not (step S203). That is, the CPU 63 analyzes the call control message, thereby checking to see if the calling party number indicative of the calling party exists or not. If the calling party number exists, the call waiting sound corresponding to the calling party number is selected with reference to a corresponding table in the memory 62 (step S204). The selected call waiting sound (from the first call waiting sound source 59) is sent to the called party (user A) (step S206).

The subsequent processes are executed in a manner similar to those in steps S7, S9, and S10 in FIG. 3.

On the other hand, if no calling party number exists in the call control message in step S203, the CPU 63 selects the predetermined call waiting sound (from the second call waiting sound source 60) (step S205). The selected call waiting sound is sent to the called party (step S206).

If the called party is not busy in step S202, the calling sound is sent to the called party (step S207). After that, if the called party has off-hooked (step S208), a calling state is set (step S209).

FIG. 9 is a format diagram showing a corresponding table between the calling party numbers and the call waiting sound sources which has been stored in the memory 62.

That is, for instance, assuming that the calling party number of the user C is set to No. 222-2222, the CPU 63 determines that the call waiting sound is set to "1" from the corresponding table. Therefore, in addition to the connection of the channel of the users A and B (shown by an arrow a in FIG. 7), the channel in the direction from the first call waiting sound source 59 to the user A is connected (shown by an arrow b in FIG. 7), thereby allowing the call waiting sound "1" to be heard by the user A. On the other hand, there is no need to store the corresponding table every calling party number. For instance, in the case of setting all of the originating calls from twenty-three wards in Tokyo into the call waiting sound "1", "03" as upper two digits of the calling party number is stored as a calling party number of the corresponding table and all of the call waiting sounds for "03" are set to "1". On the other hand, if the calling party number of the user C doesn't exist in the corresponding table, "2" is selected as a predetermined call waiting sound. In addition to the channel shown by an arrow a, the channel in the direction from the second call waiting sound source 60 to the user A is connected (shown by an arrow c), thereby allowing the call waiting sound "2" to be heard by the user A.

As mentioned above, in the private branch exchange 51 having the call waiting processing function, the user A to whom the generation of the call waiting has been informed can presume the originating call party of the call waiting call by the kind of call waiting sound. The user A can start the talk to the user C by finishing the talk to the user B so long as the user C is a significant partner more than the user B and the call time with the user B will continue for a long time. If the talk to the user B is significant, the user A can continue the talk to the user B by ignoring the reception from the user C.

In the embodiment, the first ISDN line 56 is the side to be held and the calling party number information is unnecessary. Therefore, the analog line can be also used as a first ISDN line 56 instead of the ISDN line (digital line) or an extension can be also used. If it is decided in step S203 in FIG. 8 that no calling party number exists, a sound source which has previously been stored can be also selected.

Figure 10:
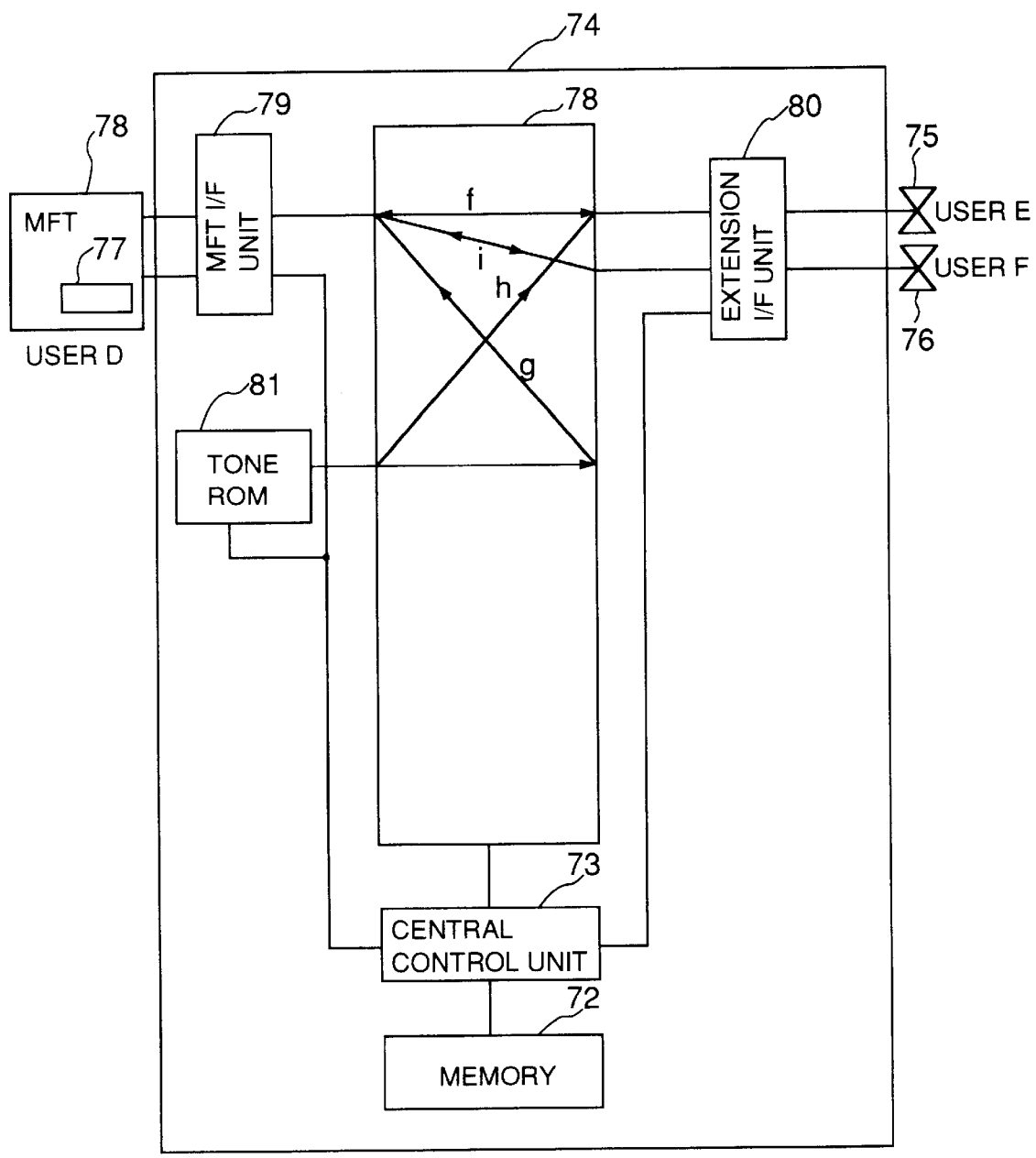
FIG. 10 is a block diagram showing the fourth embodiment of the invention.

FIG. 10 is a block diagram showing the fourth embodiment of the private branch exchange of the invention. Reference numeral 74 denotes a private branch exchange. One end of the private branch exchange 74 is connected to two extension telephones (a first extension telephone 75 and a second extension telephone 76) and the other end is connected to a digital MFT (Multifunction Telephone) 78 having a display unit 77 comprising LEDs (Light Emitting Diodes).

Reference numeral 79 denotes an MFT interface unit for enclosing the line of the MFT 78 and for executing a predetermined line control. Reference numeral 80 denotes an extension interface unit for enclosing extensions of the first and second extension telephones 75 and 76 and for executing an extension control.

Reference numeral 81 denotes a tone ROM as a sound source for supplying various kinds of tones to the MFT 78 or extension telephones 75 and 76 in accordance with the calling party identification information or the like.

In the private branch exchange 74, when an originating call to the first extension telephone 75 (the user assumes E) has been generated from the MFT 78 (the user assumes D), as shown by an arrow f, the MFT 78 and the first extension telephone 75 are connected, so that the users D and E are set into the calling state. In such a state, if an originating call has been generated from the second extension telephone 76 (the user assumes F) to the MFT 78, the extension I/F unit 80 sends the receiving party number and the calling party identification information (position information at which the extension telephone 76 is enclosed in the extension I/F unit 80) to a central control unit (CPU) 73. Then, the CPU 73 receives the receiving party number from the extension telephone 76 and analyzes it. If the called party is busy, the CPU 73 analyzes the calling party ID information and selects the call waiting sound by collating the calling party ID information and the call waiting sound source by referring to the corresponding table stored in the memory 72 and transmits a desired call waiting sound from the tone ROM 81 to the MFT 78 as shown by an arrow g. On the other hand, in the case of talking to the user F by holding the talk to the user E, the holding sound is supplied from the tone ROM 81 to the user E as shown by an arrow h and the channel is switched from the arrow f to an arrow i.

In the embodiment as mentioned above, by using the tone ROM 81 in which various kinds of sound sources including the holding sound have been stored, a plurality of different sounds can be used as a call waiting sound and a holding sound by one part and the apparatus can be simplified.

Figure 11:
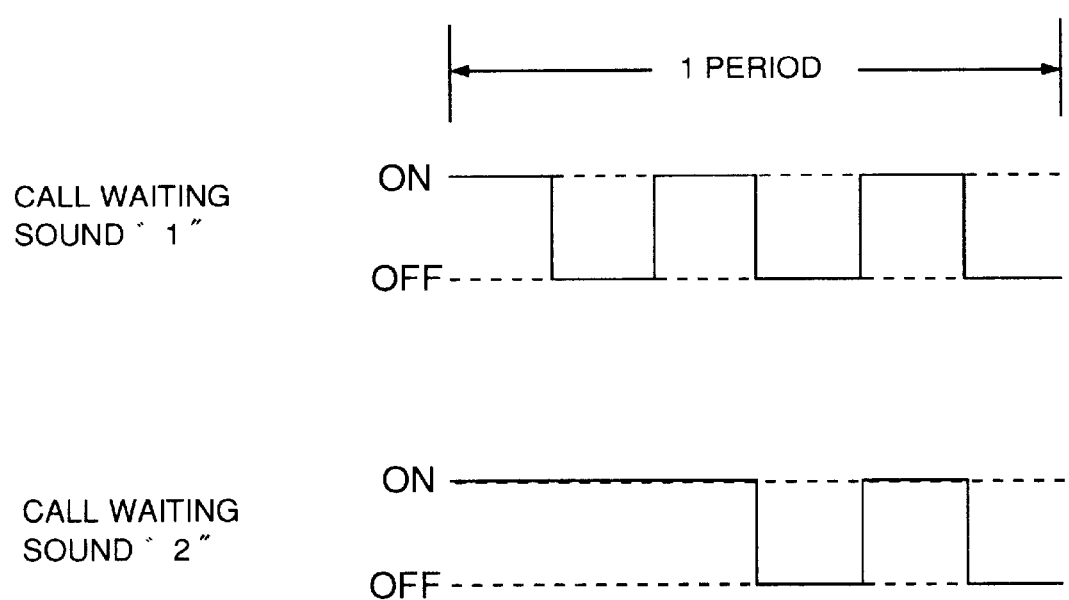
FIG. 11 is a time chart showing output patterns of call waiting sounds which are used in the fourth embodiment.

FIG. 11 is a time chart showing output patterns of the call waiting sound sources stored in the tone ROM 81. The call waiting sound "1" shows the case where the on-time and off-time are set to the same time. The call waiting sound source "2" shows the case where the on-time and off-time are set to different times. The call waiting sounds are not limited to the above discontinuous pattern but it is also possible to construct so as to set generating frequencies to different values.

Any of the analog telephones and the MFTs can be used as extension telephones 75 and 76. In the case of using the analog telephones as extension telephones 75 and 76, the extension I/F unit 80 can be replaced by the extension I/F unit 54 in FIG. 7. In the case of using the MFTs as extension telephones, the extension I/F unit 80 can be replaced by the I/F unit 79 for MFT.

Further, in the embodiment, since the MFT 78 has the display unit 77 comprising various LEDs (Light Emitting Diodes), a call waiting state can be also displayed by turning on/off the display unit 77. In such a case, a command for flickering or turning on the display unit 77 is sent to the MFT 78 from the CPU 73. By changing a flickering pattern or a color of the display unit 77 in accordance with the calling party ID information, a plurality of call waiting modes can be displayed.

As mentioned above, by displaying the call waiting modes by turning on/off the display unit 77, the call reception can be also visually confirmed.

Although the invention has been described with respect to the examples of the cases where the invention has been embodied in the private branch exchange, the invention can be also applied to a DSU (Digital Service Unit) to connect analog terminals to the digital public network. In such a case, when the DSU detects that a call waiting has been generated from the digital network, an analog tone is sent to the analog terminal. When the DSU detects the hooking of the analog terminal, it sends a response command for the call waiting to the digital network.

Although the invention has been described with respect to the preferred embodiments, the invention is not limited to the foregoing embodiments but many modifications and variations are possible within the spirit and scope of the appended claims of the invention.

We claim:

1. A telephone exchange apparatus comprising:
    connecting means for connecting a plurality of analog terminals;
    discriminating means for discriminating whether or not an incoming call is generated from a control channel of a digital line and one of the plurality of analog terminals is in communication via a communication channel of the digital line; and
    transmitting means for transmitting a predetermined repeatedly-intermittent tone to the one of the plurality of analog terminals based on a discrimination by said discriminating means.

2. An apparatus according to claim 1, wherein the discriminating means discriminates the generation of the call waiting on the basis of a command which has been received through a control channel of said digital line.

3. An apparatus according to claim 1, wherein the discriminating means has a digital line interface for connecting said digital line, and
    the transmitting means has an analog terminal interface for connecting said analog terminal.

4. A telephone exchange apparatus, comprising:
    connecting means for connecting an exclusive telephone and an analog telephone;
    input means for supplying a communication signal from a communication channel of a digital line to the analog telephone in communication via the digital line;
    generating means for generating a predetermined tone indicative of a generation of a call waiting from a control channel of the digital line; and
    transmitting means for synthesizing the communication signal supplied from the input means and the predetermined tone and for transmitting a synthesized signal to the analog telephone in accordance with an incoming call from the control channel of the digital line.

5. An apparatus according to claim 4, wherein when the generation of the call waiting is detected on the basis of a command received through a control channel of the digital line, the transmitting means synthesizes the communication signal and the predetermined tone.

6. An apparatus according to claim 5, wherein the transmitting means has a digital line interface for connecting the digital line and an analog terminal interface for transmitting the communication signal and the predetermined tone which have been synthesized to the communicating apparatus as an analog signal.

7. A call waiting notifying apparatus comprising:
    analyzing means for analyzing a calling party identification in a case where a call waiting has been generated;
    selecting means for selecting one of a plurality of predetermined repeatedly-intermittent tones in accordance with the calling party identification; and
    notifying means for notifying a called party of the call waiting by using the selected repeatedly-intermittent tone.

8. An apparatus according to claim 7, wherein the selecting means has a memory in which calling party identifications have previously been stored, and the selecting means selects one of the plurality of predetermined repeatedly-intermittent tones on the basis of the calling party identification which has been analyzed by the analyzing means and the calling party identification stored in the memory.

9. An apparatus according to claim 7, wherein the calling party identification includes the calling party number.

10. A key telephone main unit comprising:
    exchanging means which can connect a digital line, an exclusive telephone, and a single analog telephone; and
    generating means for generating a tone indicative of a generation of a call waiting,
    wherein when a call reception is generated from a control channel of the digital line and the single analog telephone is in communication using a communication channel of the digital line, the exchanging means transmits, to the single analog telephone, a signal in which a communication signal to the single analog telephone and the tone from said generating means are synthesized.

11. A key telephone main unit according to claim 10, wherein the exchanging means has discriminating means for discriminating whether the call waiting has been generated or not on the basis of a command received through a control channel of the digital line.

12. A key telephone main unit according to claim 10, wherein the exchanging means comprises a three-party conference circuit to synthesize the communication signal and the tone.

13. A key telephone main unit according to claim 10, wherein the digital line includes an ISDN.

14. An apparatus according to claim 1, wherein the digital line includes an ISDN.

15. An apparatus according to claim 4, wherein the digital line includes an ISDN.

16. An apparatus according to claim 4, wherein the transmitting means comprises a three-party conference circuit to synthesize the communication signal and the predetermined tone.

17. An apparatus according to claim 7, wherein the analyzing means analyzes the calling party identification on the basis of a command received through a control channel of a digital line.

18. An apparatus according to claim 17, wherein the digital line includes an ISDN.

19. A method for notifying a call waiting in a private exchange apparatus to one of a plurality of extension terminals which is in communication via a digital external line, comprising the steps of:

(a) sending a predetermined tone to one of the plurality of extension terminals, in accordance with an incoming call from a control channel of the digital external line;

(b) sending a communication signal from the communication channel of the digital external line to the one of the plurality of extension terminals, after the predetermined tone is sent to one of the plurality of extension terminals during a first predetermined time;

(c) sending the predetermined tone to one of the plurality of extension terminals, after the sending of the communication signal to the extension terminal sent to one of the plurality of extension terminals; and (d) returning to said step (b) and repeating said step (b) and said following steps.

20. A method according to claim 19, wherein the extension terminal communicates an analog signal.

21. A method according to claim 19, wherein the extension terminal includes a single line telephone.

22. A method according to claim 19, wherein the digital external line includes an ISDN.

23. A method according to claim 19, wherein in said step (a) a communication path between the extension terminal and the communication partner is disconnected in accordance with the incoming call.

24. A method according to claim 19, wherein in said step (b) a communication path between the extension terminal and the communication partner is established after the sending of the predetermined tone is stopped during the second predetermined time.

25. A method according to claim 19, wherein in said step (d) said step (b) and said following steps are repeated until a predetermined operation is performed at the extension terminal.

26. A method according to claim 25, wherein the predetermined operation includes a hooking operation.

27. A method according to claim 19, wherein in said step (d) a communication path between the extension terminal and the incoming call is established when a predetermined operation is performed at the extension terminal.

28. A method according to claim 19, wherein in said steps (a) and (c) the predetermined tone is generated from a second source built in the private exchange apparatus.

29. A method according to claim 27, wherein in said steps (a) and (c) the predetermined tone is generated through a switching circuit built in the private exchange apparatus.

30. A method according to claim 29, wherein the predetermined tone is intermittent by controlling the switching circuit.

31. A call waiting notifying method in a private exchange to which a plurality of extensions are connected, comprising the steps of:

discriminating whether or not an incoming call is generated from a control channel of a digital line and one of a plurality of analog terminals is in communication via a communication channel of the digital line; and transmitting to one of the plurality of terminals a predetermined tone notifying one of the plurality of terminals of a call waiting and a communication signal from the communication channel of the digital line alternately and repeatedly, based on a discrimination from said discriminating step.

32. A method according to claim 31, wherein the call waiting is discriminated on the basis of a command which has been received through a control channel of the digital line.

33. A method according to claim 31, wherein the call waiting is discriminated using a digital line interface for connecting the digital line, and the predetermined repeatedly-intermittent tone is transmitted through an analog terminal interface for connecting an analog terminal.

34. A method according to claim 31, wherein the call waiting from the digital line including an ISDN is discriminated.

35. A method according to claim 31, wherein the call waiting to the terminal including an analog terminal is discriminated.

36. A call waiting notifying method of a telephone exchange apparatus to which an exclusive telephone and an analog telephone are connected, comprising the steps of:

detecting a call waiting to the analog telephone based on a call from a control channel of a digital line and communication performed by the analog telephone via a communication channel of the digital line;

synthesizing a communication signal to be transmitted from the communication channel of the digital line to the analog telephone and an audio signal for notifying the call waiting; and transmitting the communication signal and the audio signal synthesized in said synthesizing step to the analog telephone.

37. A method according to claim 36, wherein the call waiting is detected based on a call from an ISDN.

38. A method according to claim 36, wherein the communication signal and the audio signal are synthesized by a conference circuit in said synthesizing step.

39. An incoming call notifying method of a telephone exchange apparatus to which an exclusive telephone and an analog telephone are connected, comprising the steps of:

detecting an incoming call from a control channel of a digital line;

synthesizing an incoming call notifying signal and a communication signal to be transmitted from the communication channel of the digital line to the analog telephone in communication via the communication channel of the digital line; and transmitting the incoming call notifying signal and the communication signal synthesized in said synthesizing step to the analog telephone in communication.

40. A method according to claim 39, wherein an incoming call from an ISDN is detected in said detecting step.

41. A method according to claim 39, wherein the communication signal and the incoming call notifying signal are synthesized by a conference circuit in said synthesizing step.

42. A telephone exchange apparatus comprising:

connecting means for connecting a plurality of analog terminals;

detecting means for detecting an incoming call from a control channel of a digital line in a case where one of the plurality of terminals is in communication via a communication channel of the digital line; and transmitting means for transmitting a predetermined tone to one of the plurality of terminals which is in communication via the communication channel of the digital line in accordance with the incoming call from the control channel of the digital line detected by said detecting means in the case where one of the plurality of terminals is in communication via the communication channel of the digital line.

43. An apparatus according to claim 41, wherein said transmitting means alternately transmits the predetermined tone and a communication signal to be transmitted from the digital line, to one of the plurality of terminals.

44. An apparatus according to claim 41, wherein said transmitting means synthesizes the predetermined tone and a communication signal to be transmitted from the digital line, and transmits the synthesized signal to one of the plurality of terminals.

45. An apparatus according to claim 41, wherein said transmitting means transmits the predetermined tone to one of a plurality of analog terminals.

46. A call waiting method in a telephone exchange apparatus to which a plurality of analog terminals are connected, comprising the steps of:

detecting an incoming call from a control channel of a digital line in a case where one of the plurality of terminals is in communication via a communication channel of the digital line; and transmitting a predetermined tone to one of the plurality of terminals which is in communication via the communication channel of the digital line in accordance with the incoming call from the control channel of the digital line detected in said detecting step in the case where one of the plurality of terminals is in communication via the communication channel of the digital line.

47. A method according to claim 46, wherein the predetermined tone and a communication signal to be transmitted from the digital line are alternately transmitted to one of the plurality of terminals.

48. A method according to claim 46, wherein the predetermined tone and a communication signal to be transmitted from the digital line are synthesized with each other, and the synthesized signal is transmitted to one of the plurality of terminals.

49. A method according to claim 46, wherein the predetermined tone is transmitted to one of a plurality of analog terminals.

* * * * *

UNITED STATES PATENT AND TRADEMARK OFFICE
CERTIFICATE OF CORRECTION

PATENT NO. : 5,857,017

DATED : January 5, 1999

INVENTOR(S) : HIROKAZU OHI ET AL.

It is certified that error appears in the above-identified patent and that said Letters Patent is hereby corrected as shown below:

```
On the title page, item
[56] REFERENCES CITED

Foreign Patent Documents
   "6224155" should read --62-224155--;
   "63294054" should read --63-294054--.
   "3078364" should read --3-078364--.
   "0145855" should read --1-45855--.
   Insert: --1-248747 10/98 Japan--.

COLUMN 1

Line 12, "to" should read --to the--.

COLUMN 4

Line 67, "an" should read --a--.

COLUMN 5

Line 1, "an" should read --a--.

COLUMN 6

Line 20, "an" (both occurrences) should read --a--.
```

UNITED STATES PATENT AND TRADEMARK OFFICE
CERTIFICATE OF CORRECTION

PATENT NO.   : 5,857,017

DATED        : January 5, 1999

INVENTOR(S)  : HIROKAZU OHI ET AL.

It is certified that error appears in the above-identified patent and that said Letters Patent is hereby corrected as shown below:

COLUMN 11

Line 41, "27," should read --19,--.

COLUMN 12

Line 62, "41," should read --42,--.
   Line 66, "41," should read --42,--.

COLUMN 13

Line 4, "41," should read --42,--.

Signed and Sealed this

Ninth Day of November, 1999

*Attest:*

Q. TODD DICKINSON

*Attesting Officer*      *Acting Commissioner of Patents and Trademarks*